Figure 1:
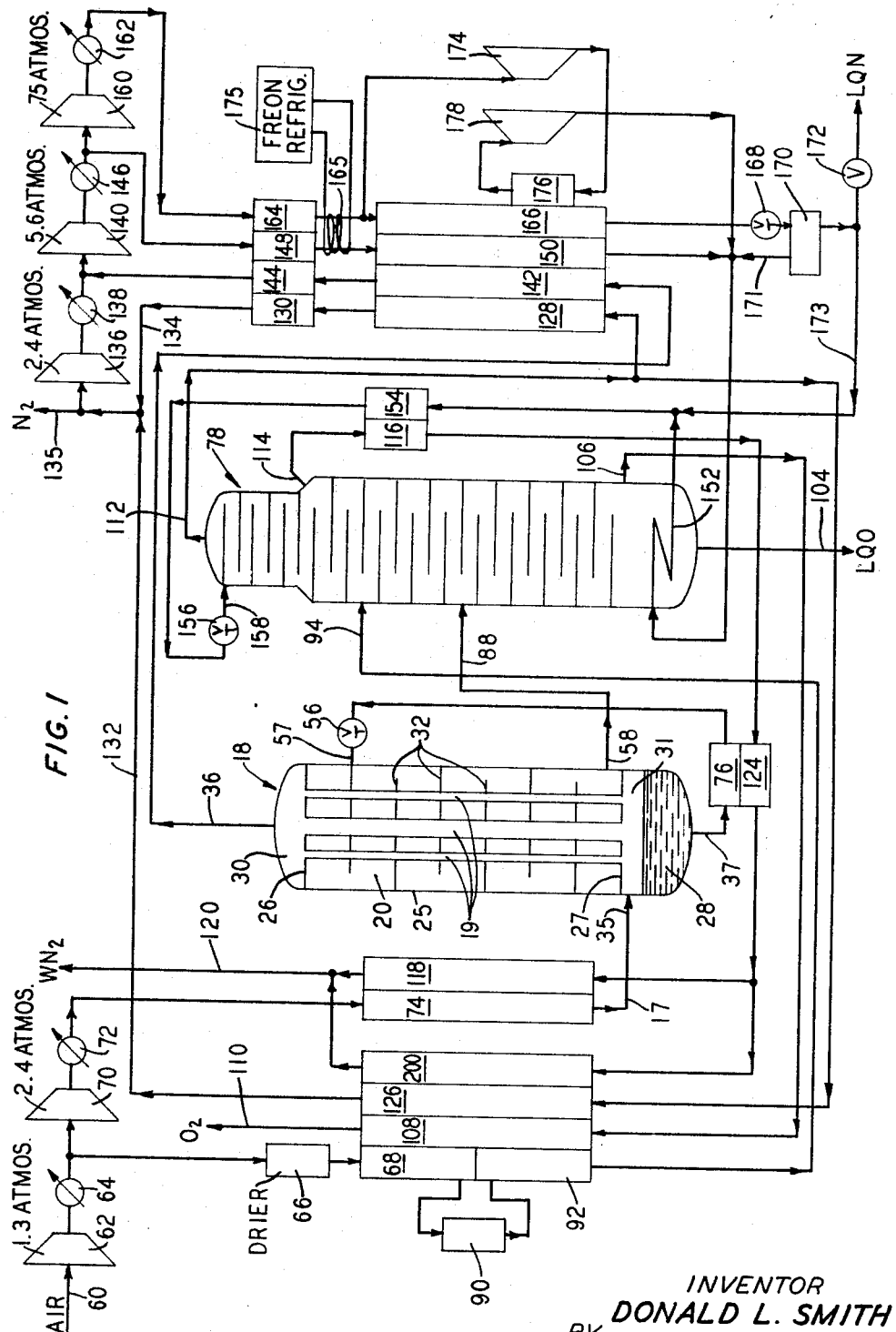

July 16, 1968　　　　　　　D. L. SMITH　　　　　　　3,392,536
RECOMPRESSION OF MINGLED HIGH AIR SEPARATION
USING DEPHLEGMATOR PRESSURE AND COMPRESSED
LOW PRESSURE EFFLUENT STREAMS
Filed Sept. 6, 1966　　　　　　　　　　　　　　2 Sheets-Sheet 2

INVENTOR
DONALD L. SMITH
BY
Francis B. Henry
ATTORNEY

United States Patent Office 3,392,536
Patented July 16, 1968

3,392,536
RECOMPRESSION OF MINGLED HIGH AIR SEPARATION USING DEPHLEGMATOR PRESSURE AND COMPRESSED LOW PRESSURE EFFLUENT STREAMS
Donald L. Smith, Berkeley Heights, N.J., assignor to Air Reduction Company, Incorporated, New York, N.Y., a corporation of New York
Filed Sept. 6, 1966, Ser. No. 577,346
19 Claims. (Cl. 62—13)

This invention relates to means and methods for separating air into components, and more particularly to the use of a dephlegmator in the production of tonnage oxygen.

The term "tonnage oxygen" is commonly used in the trade to designate oxygen of purity 95 to 98 percent. While there is considerable commercial demand for oxygen of higher purity, for example 99.5 percent pure, the production of tonnage oxygen is highly important commercially.

Tonnage oxygen and oxygen of still higher purity is commonly produced from air by separation in two successive stages of rectification in conventional rectifying columns. In accordance with the present invention, I substitute for the usual first rectification stage a dephlegmator, or condenser-vaporizer, operated in a particular manner, substantially as disclosed in my copending application, Ser. No. 577,421, filed of even date herewith and assigned to the owner of the present application.

In addition to the use of the dephlegmator in the process in novel manner, I provide improved refrigeration cycles especially designed to reduce the cost of oxygen production below what is obtainable in prior art processes.

In the dephlegmator, a portion of an incoming air stream is liquefied and enriched in oxygen content up to about 42 mole percent in the condenser portion of the dephlegmator, and the oxygen-rich liquid is vaporized in the vaporizer portion. The vaporized oxygen-rich material, still at or near saturation temperature, is used as a feed for a low pressure rectification column, or oxygen column, of generally conventional design, wherein tonnage oxygen is produced. The oxygen output may be made available either as gaseous product or as liquid product.

In the conventional two-column air separation plant, the first column, usually called the nitrogen column or the high pressure column, must be operated at a pressure sufficiently above atmospheric pressure to raise the saturation temperature of nitrogen gas at that pressure to a temperature close to the boiling temperature of oxygen in the second column, usually called the oxygen column or the low pressure column, which latter column is only slightly above atmospheric pressure. By so raising the saturation temperature of the nitrogen, it is possible to employ condensing nitrogen gas at the top of the high pressure column to supply heat to boil oxygen-rich liquid in the low pressure column. For this purpose, the incoming air stream must be compressed to about 5 to 7 atmospheres before iti s fed into the high pressure column.

An advantage in using the dephlegmator as the first stage in an air separation process, instead of the usual high pressure, or nitrogen column, lies in the fact that the dephlegmator operates at a considerably lower pressure than the usual nitrogen column. My process has the additional advantage that part of the incoming air stream is not even compressed to the relatively low pressure required by the dephlegmator. This part of the air stream is compressed only sufficiently to propel the products through the system. Economies of capital cost and operating expense are effected as a result of the use of the reduced pressures.

Other features, objects and advantages will appear from the following more detailed description of illustrative embodiments of the invention, which will now be given in conjunction with the accompanying drawings.

Figure 2:
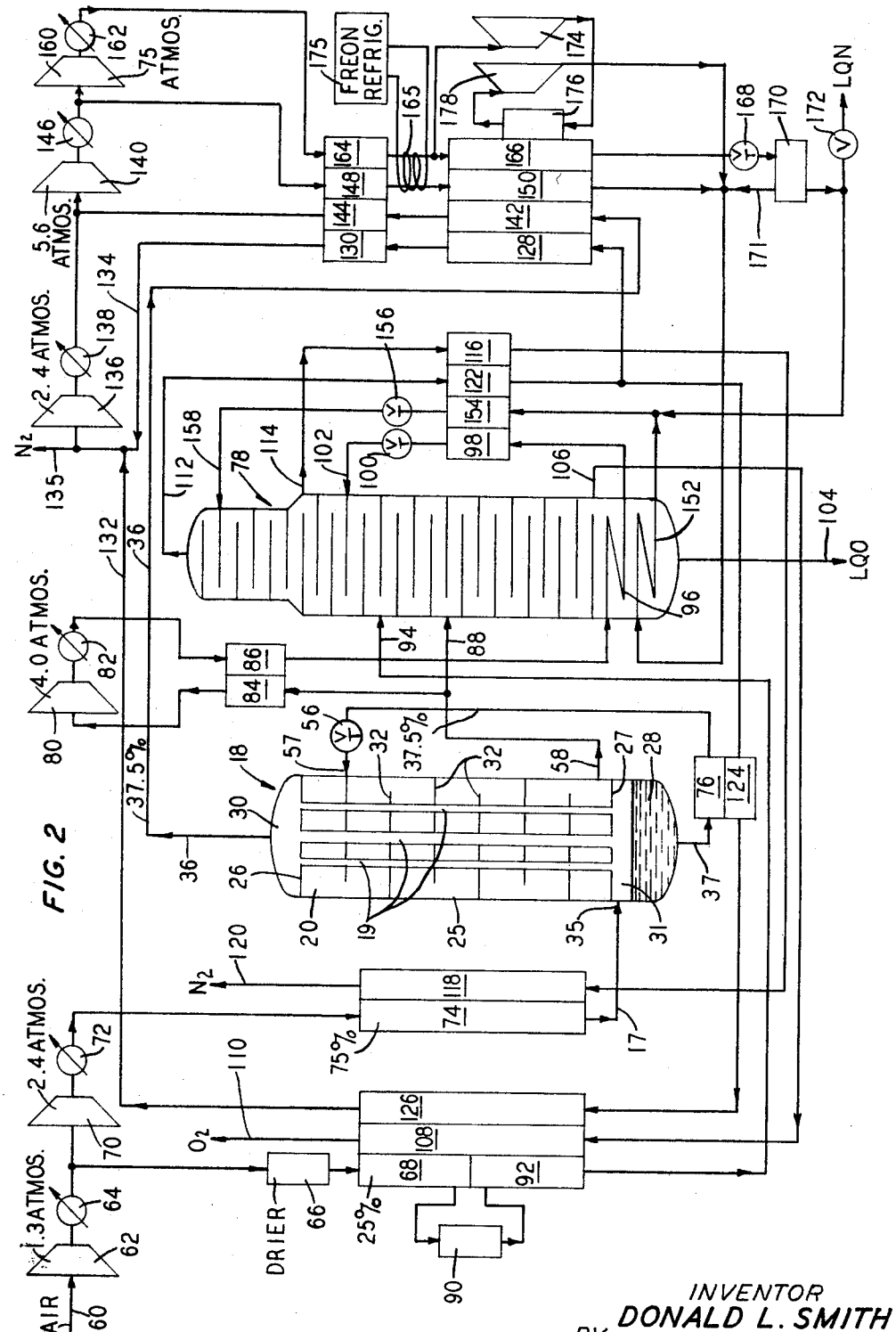

In the drawings,
FIG. 1 is a flow sheet or schematic diagram for an air separation plant embodying the invention; and
FIG. 2 is a flow sheet or schematic diagram for a modified form of the plant illustrated in FIG. 1.

Referring to FIG. 1, and first describing briefly the over-all features of the system, there is shown an arangement in which an incoming air stream in a conduit 60 is compressed to about 1.3 atmospheres absolute pressure whereupon the stream is divided into two parts. In one part the air is dried and freed from carbon dioxide, cooled to saturation temperature and delivered to an intermediate level of an oxygen column 78. In the other part the air is compressed to about 2.4 atmospheres, cooled to saturation temperature at the higher pressure, dried and freed from carbon dioxide, and delivered to the condenser portion of a dephlegmator 18. Oxygen-rich liquid produced in the condenser portion of the dephlegmator is sub-cooled, and expanded to about 1.3 atmospheres, at which pressure it can be vaporized by means of the heat of condensation generated in the condenser portion. The vaporized oxygen-rich material is delivered to the oxygen column 78 as feed for that column. Either liquid oxygen or gaseous oxygen or both can be withdrawn from the oxygen column as product.

Nitrogen effluent both from the dephlegmator and from the oxygen column is used in refrigeration cycles to provide the necessary cooling of the various process streams and to provide reflux for the oxygen column.

Several indirect heat exchangers or regenerators appear in FIG. 1. A first of these devices comprises passages 68 and 92 wherein material is cooled by indirect heat exchange with colder material in passages 108, 126 and 200. A second comprises a passage 74 wherein material is cooled by colder material in passage 118. A third comprises a passage 76 wherein a liquid is sub-cooled by indirect heat exchange with colder material in a passage 124. A fourth of these devices comprises passage 154 in which material is cooled by colder material in passage 116. A fifth comprises passages 148 and 164 in which material is cooled by colder materials in passages 130 and 144. A sixth device comprises passages 150 and 166 in which material is cooled by colder materials in passages 128, 142 and 176. In what follows the several passages will be referred to by their reference numerals with or without repetition of the function of heating or cooling associated with each passage.

The system shown in FIG. 1 will now be described in greater detail.

Referring to FIG. 1, a conduit 60 is shown for delivering substantially dust-free air to a compressor 62 wherein the air is compressed to about 1.3 atmospheres absolute pressure. An after-cooler 64 is provided in the outlet from the compressor 62 to cool the air to about ambient temperature, say 300 degrees Kelvin. The air stream from the after-cooler 64 is divided into two parts, about 25 percent of the air being sent through a drier 66 to an indirect heat exchange passage 68 wherein the air is cooled by indirect heat exchange with colder gases which are produced in the process as will be described more fully hereinafter. From the cold end of the passage 68 the air stream is diverted through an adsorber 90 wherein carbon dioxide is removed from the air feed. The stream is further cooled in the passage 92 and fed into an intermediate level of the oxygen column 78 at an inlet 94.

The remainder of the air, about 75 percent, is further compressed to about 2.4 atmospheres in a compressor 70, cooled to about 300 degrees Kelvin in an after-cooler 72 and delivered into an indirect heat exchange passage 74 wherein this part of the air is cooled by indirect heat exchange with colder gas, preferably relatively impure nitrogen produced in the process as will be described more fully hereinafter, and is freed from water vapor and carbon dioxide.

For the purpose of removing water vapor and carbon dioxide, the passages 74 and 118 are preferably operated as a reversing regenerator pair in known manner so that air passing through one of these passages is substantially freed of water vapor and carbon dioxide while being cooled, these undesired materials freezing out and being deposited upon the walls of the passage in solid form. Waste nitrogen gas passing through the other passage of the pair removes the accumulated solids, mainly by sublimation. Upon reversal of the pair of passages, the newly cleaned passage serves to pass and cool the incoming air stream while the passage with the accumulated solids is subjected to the action of the waste nitrogen gas to effect the cleaning operation.

The air in the passage 74 is cooled to saturation temperature, about 90 degrees Kelvin, and is delivered to the condenser inlet 35 of a condenser-vaporizer or dephlegmator 18 through a conduit 17, at approximately 2.4 atmospheres.

The dephlegmator 18 comprises an outer casing 25 having internal end plates 26, 27 which rigidly support a tube bundle 19 providing internal surfaces for effecting condensation of vapor rising through the tubes. The tubes open into the upper end 30 and lower end 31 of the device. A space 20 surrounding the tubes is divided by a suitable number of transversely arranged baffles or trays 32. The outer surfaces of the tubes are heated by the condensing material within the tubes to effect vaporization of the material on the trays. Liquid to be vaporized is delivered to the top-most tray through an inlet 57. The liquid trickles down from one tray to the next below, evaporating while it descends.

The air entering the inlet 35 passes up through the tubes 19 wherein it is partially condensed and rectified. Substantially pure nitrogen gas leaves as effluent at the top of the dephlegmator by way of a conduit 36, while a liquid enriched in oxygen forms a pool 28 in the lower end 31. The dephlegmator is so designed and regulated that approximately 50 percent of the air is condensed. The resulting liquid contains about 42 mole percent of oxygen.

The percentage condensation is regulated by the height of the condensing column, the temperature of the cold liquid supplied to the top of the column, the rate of flow of the air stream into the condenser, and the rate of flow of nitrogen effluent from the top of the condenser. The resultant percentage of oxygen in the oxygen-enriched liquid is limited in its maximum amount by the equilibrium condition between the incoming air stream and the pool of condensate in contact with the air stream at the pressure existing at the surface of the pool.

The oxygen-enriched liquid from the pool 28 is passed through a conduit 37 to a sub-cooling passage 76 which is cooled by indirect heat exchange with colder gas, preferably nitrogen from the upper portion of the low pressure or oxygen column 78 as more fully described hereinafter. The sub-cooled liquid coming from the passage 76 is expanded to about 1.3 atmospheres in a throttle valve 56 and delivered to the top-most tray of the vaporizer by way of the inlet 57. The liquid trickles down from tray to tray, evaporating while it descends. The liquid serves as a cooling medium about the tubes 19 which contain the compressed air. Finally when all the liquid has evaporated, the material emerges through an outlet 58 as oxygen-enriched vapor.

The vapor in the outlet 58 is delivered into a suitable level of the rectifier column 78 by way of an inlet 88, constituting a portion of the feed to the rectifier column. As noted above, another portion of the feed comes from the 25 percent of the incoming air stream in the indirect heat exchange passage 92, delivered through the inlet 94 to the column 78 at a suitable level somewhat higher up than the inlet 88.

Product oxygen of purity about 95 to 98 percent can be taken from the bottom of the rectifier column 78 either in the form of liquid which collects in the bottom of the column or as gas which boils off from the liquid pool. An outlet conduit 104 is shown for removing liquid oxygen, and an outlet conduit 106 for taking off gaseous oxygen. The gas from the outlet 106 is sent through the passage 108 in indirect heat exchange with the passages 68 and 92 to aid in cooling the incoming air stream. The product oxygen gas, warmed to about ambient temperature, is delivered to a conduit 110.

The column 78 makes available highly pure nitrogen effluent at the top, delivered to a conduit 112, and nitrogen gas of lesser purity at a lower level, delivered to a conduit 114. The nitrogen gas in the conduit 114 is passed through an indirect heat exchange passage 116 wherein it serves to cool liquid nitrogen in the passage 154. The nitrogen gas then goes through passage 124 wherein it serves to sub-cool oxygen-enriched liquid in passage 76. The nitrogen gas then goes through passages 200 and 118 in parallel to aid in cooling incoming air, whence it may go to waste by way of a conduit 120.

The highly pure nitrogen gas in the conduit 112 is available as nitrogen product, and is used as reflux for the column 78, and also as nitrogen recycle refrigerant.

The gas in the conduit 112 divides, part going through the indirect heat exchange passage 126 wherein it aids in cooling the 25 percent of incoming air in passages 92 and 68.

The other part of the highly pure nitrogen gas goes through successive indirect heat exchange passages 128 and 130 wherein it serves to cool nitrogen product and nitrogen reflux.

Material from passage 126 is delivered through a conduit 132 to join with material from passage 130 in a conduit 134, the combined streams being delivered to the inlet side of a compressor 136 in the outlet of which a pressure of about 2.4 atmospheres is maintained, the compressor 136 being followed by an after-cooler 138. Gaseous nitrogen product is made available in a conduit 135 connected to conduits 132 and 134.

The material from the after-cooler 138 is joined at the inlet of a compressor 140 by highly pure nitrogen effluent from the top of the dephlegmator 18 which passes through the conduit 36, and indirect heat exchange passages 142 and 144 wherein it serves to cool other streams as will appear hereinafter. The compressor 140 maintains an outlet pressure of about 5.6 atmospheres and is followed by an after-cooler 146.

The output of the after-cooler 146 divides into two parts.

One part goes through successive indirect heat exchange passages 148 and 150 wherein it is cooled by streams above described in passages 128, 130, 142, 144. Thence it goes through a reboiler coil 152 wherein it serves to reboil liquid in the pool in the bottom of the column 78 and is liquefied. Thence the material goes through an indirect heat exchange passage 154 wherein it is sub-cooled by the stream in passage 116. Next, the material is expanded in a throttle valve 156 and delivered to the top-most part of the column 78 by way of an inlet 158 as reflux liquid for the column.

The remaining part of the output from the after-cooler 146 is compressed to about 75 atmospheres in a compressor 160, followed by an after-cooler 162. The highly compressed nitrogen from the after-cooler 162 is cooled in the indirect heat exchange passage 164, the output from which divides into two parts. One part is further cooled in the indirect heat exchange passage 166 by streams above mentioned in passages 128 and 142, is expanded and partially liquefied in a throttle valve 168 and delivered to a vapor-liquid separator 170 from which latter product liquid nitrogen can be withdrawn through a control valve 172. The other part of the output from the passage 164 is work-expanded in a turbine 174, re-heated in the indirect heat exchange passage 176 in indirect heat exchange with passages 150 and 166, work-expanded in a turbine 178 and delivered to the reboiler coil 152 along with material from passage 150. Vapor collecting at the top of the separator 170 is also added by way of a vent 171 to the material going to the re-boiler coil 152. Also, liquid nitrogen from the separator 170 is delivered through a conduit 173 to the passage 154 along with liquid condensed in the reboiler coil 152 to augment the reflux stream delivered to the inlet conduit 158.

The feature of employing re-heat in passage 176 between the expansion turbines 174 and 178 is in accordance with the invention disclosed and claimed in the co-pending application of Donald L. Smith and John L. Ferrell, Ser. No. 494,177, filed Oct. 8, 1965, and assigned to the owners of the present application.

The cooling of the process streams in the passages 148 and 164 is preferably supplemented by refrigeration from a conventional Freon refrigerator 175 applied through means such as a cooling coil 165 introduced between the cold ends of the passages 148 and 164 and the warm ends of the passages 150 and 166.

Conventional means may be incorporated in known manner into the compressors 136, 140 and 160 whereby the rate of flow of gas through each compressor can be regulated without materially varying the outlet pressures of the respective compressors. By suitably proportioning the flow rates in the compressors, the system can be adjusted to provide the required amount of liquid reflux for the nitrogen column and to provide additional refrigeration for liquefaction processes.

FIG. 2 shows a modified form of the air separation plant illustrated in FIG. 1. To describe the system shown in FIG. 2, it will be sufficient to point out the differences between the two systems, as the general mode of operation of the system of FIG. 2 is similar to that of the system of FIG. 1.

In the system of FIG. 2, a portion of the oxygen-enriched vapor from the outlet 58 is led off to a compressor 80, whereas in the system of FIG. 1 all of the vapor from the outlet 58 is delivered directly into the inlet 88 in the column 78. In FIG. 2, the compressor 80 is preceded by a passage 84 and followed by an after-cooler 82 and a passage 86. The vapor approaching the compressor 80 is pre-heated in passage 84 by vapor leaving the after-cooler 82 by way of passage 86. The vapor leaving the passage 86 is liquefied in a reboiler coil 96 immersed in boiling liquid in the bottom of column 78 adjacent to the reboiler coil 152, is sub-cooled in a passage 98 in indirect heat exchange with colder streams in passages 116 and 122, and is throttled in valve 100, wherein the pressure of the liquid is reduced to about the operating pressure of the column 78. This liquid is conducted into that column by way of an inlet 102 at a level of the column somewhat above the level at which any unliquefied feed is introduced into the column. It will be noted that the vapor feed inlets 88 and 94 are below the inlet 102 as shown in FIG. 2. The liquid feed at inlet 102 serves to increase the total liquid input to the column as compared to the case of FIG. 1.

A process stream is shown in FIG. 2 which passes nitrogen effluent from the top of column 78 through the outlet 112, the passage 122, the passage 124, and the passage 126 to the conduit 132. In FIG. 1, this stream is directed through the outlet 112 immediately into the passage 126.

In FIG. 2, the nitrogen vapor in the conduit 114 is passed through the passage 116 as in FIG. 1 and here helps to cool warmer liquids in passage 98 as well as in passage 154. From passage 116, the vapor goes directly to passage 118 wherein it serves to cool incoming air in passage 74, and then goes to waste through conduit 120.

FIG. 2 omits the passage 200 in indirect heat exchange relationship with the passages 68, 92, 108, and 126 shown in FIG. 1.

While a working pressure of 2.4 atmospheres absolute in the condenser portion of the condenser-vaporizer has been specified and is the preferred value, a range of pressure from about 2 to 3 atmospheres is allowable, depending upon such factors as the pressure drop in the heat exchanger 74, and the temperature gradient between the heat transfer surfaces of the condenser-vaporizer. The lower the pressure, the larger the heat exchangers and the condense-vaporizer required, with the result that the capital investment in plant is increased. On the other hand, the higher the pressure, the more power is required to operate the compressors. Consistent with these general limits, the lowest pressure is preferred. The outlet pressure of the compressors 70 and 136 should match the working pressure in the condenser.

While a pressure of approximately 1.3 atmospheres absolute has been specified in the vaporizer portion of the condenser-vaporizer, in the outlet of the compressor 62, and as the operating pressure of the oxygen column 78, this value is not critical. The pressure should be as low as may be while still sufficient to propel the products through the system.

While preferred outlet pressures are specified as 5.6 atmospheres for compressor 140, 75 atmospheres for compressor 160, and 4 atmospheres for compressor 80, each of these pressure values may be varied over a range without departing from the principles of the invention. The compressor 140 may vary within a range from about 5 to 7 atmospheres, the compressor 160 from about 45 to 90 atmospheres and the compressor 80 from about 3 to 5 atmospheres.

In the condenser-vaporizer, the oxygen content of the enriched air product will vary to some extent with the operating pressure of the condenser, ranging from about 43 percent at 2 atmospheres to about 41 percent at 3 atmospheres.

Over the entire pressure range it will generally be preferable to adjust the condenser-vaporizer to condense approximately 50 percent of the air stream fed thereto.

One of the advantages of the present invention over the prior art lies in the arrangement whereby the compressors 136, 140 and 160 can be combined in one piece of machinery whereas in the prior art at least two separate machines are required in the production of refrigeration and the compressing of reflux liquids. Accordingly, the compressors 136, 140 and 160 are shown in the drawings as connected to a single power shaft that is indicated schematically by a broken line 200.

While an illustrative form of apparatus and methods in accordance with the invention have been described and shown herein, it will be understood that numerous changes may be made without departing from the general principles and scope of the invention.

What is claimed is:

1. The process of separating air into product components, which process comprises the steps of compressing an air feed stream to a relatively low pressure sufficient to propel said stream through the process, dividing the compressed stream into a major part comprising about 75 mole percent and a minor part comprising the remainder, supply said minor part as a first fed stream to a rectifying column operated at said relatively low pressure, further compressing said major part to a pressure of 2 to 3 atmospheres absolute, condensing substantially 50 mole percent of said further compressed stream to form an oxygen-enriched condensate by indirect heat exchange with a colder stream, sub-cooling said condensate, expanding said subcooled condensate to said relatively low pressure, whereby said expanded material constitutes said colder stream for accomplishing said condensing step, vaporizing said oxygen-enriched condensate in said indirect heat exchange with said further compressed air stream, supplying said vaporized oxygen-enriched condensate to said rectifying column as a second feed stream therefor, rectifying said feed streams into one or more product streams in said rectifying column, compressing an effluent from said rectifying column to said pressure of 2 to 3 atmospheres absolute, mingling said compressed effluent with the uncondensed portion of said major part of the original air feed stream, further compressing said mingled streams to about 5 to 7 atmospheres absolute pressure, and utilizing said latter compressed materials to supply refrigeration to sustain the process.

2. The process according to claim 1, in which the pressure to which the said major part of the original air stream is compressed is substantially 2.4 atmospheres absolute.

3. The process according to claim 1, in which the pressure to which the said mingled streams is compressed is substantially 5.6 atmospheres absolute.

4. The process according to claim 1, together with the step of further compressing a portion of the said mingled streams to about 45 to 90 atmospheres absolute pressure to provide refrigeration for effecting liquefaction of a product stream while supplying the needed refrigeration to support the process.

5. The process according to claim 4, in which the pressure to which the last mentioned compression step is carried is substantially 75 atmospheres absolute.

6. In a refrigeration system for an air separation process, which process employs a dephlegmator as a first rectifying stage in which an air feed flows in direct and out of contact heat exchange relationship with a vaporizable refrigerant and a low pressure oxygen column as a second rectifying stage, in combination, a first compressor for compressing effluent from said oxygen column to a pressure of 2 to 3 atmospheres absolute, means to mingle the output from said first compressor with an uncondensed output stream from the condenser portion of said dephlegmator, a second compressor for compressing said mingled streams to a pressure of 5 to 7 atmospheres absolute, means for utilizing an output from said second compressor to supply refrigeration to sustain the process, and a common drive means for said first and second compressors.

7. Apparatus in accordance with claim 6, in which the pressure produced by said first compressor is substantially 2.4 atmospheres absolute.

8. Apparatus in accordance with claim 6, in which the pressure produced by said second compressor is substantially 5.6 atmospheres absolute.

9. Apparatus in accordance with claim 6, together with a third compressor for further compressing a portion of the output of said second compressor to a pressure of 45 to 90 atmospheres absolute to supply refrigeration for effecting liquefaction of a product stream while supplying the needed refrigeration to support the process, said common drive means serving all three said compressors.

10. Apparatus according to claim 9, in which the pressure produced by said third compressor is substantially 75 atmospheres absolute.

11. In a system for separating the components of air, in combination, an oxygen column designed to operate at a relatively low pressure sufficient to propel the products through the system, said products including oxygen and effluent nitrogen, a first stage air compressor producing said operating pressure of said oxygen column, means to cool approximately to saturation temperature about 25 percent of the compressed air from said compressor and conduct the same to said oxygen column as a first feed stream therefor, a second stage air compressor producing an output pressure of about 2 to 3 atmospheres absolute, means to conduct the remaining compressed air from said first stage compressor to said second stage compressor, a condenser-vaporizer comprising a condenser portion in indirect heat exchange relationship with a vaporizer portion, said condenser portion being adjusted to condense approximately 50 percent of an incoming approximately saturated air stream and rectify the same to form an oxygen-enriched liquid of approximately 41 to 43 percent oxygen content and a nitrogen effluent of high purity, and said vaporizer portion being adjusted to vaporize substantially the whole oxygen-enriched liquid output of the said condenser portion, means to cool approximately to saturation temperature the output of said second stage compressor and conduct the same to the said condenser portion of the condenser-vaporizer as a feed stream therefor, means to sub-cool the said oxygen-enriched liquid leaving said condenser portion, means to expand the said sub-cooled oxygen-enriched liquid to the said operating pressure of said oxygen column and conduct the same to the said vaporizer portion to be vaporized therein, means to conduct the so vaporized material to said oxygen column as a second feed stream therefor, means to compress nitrogen effluent from said condenser-vaporizer together with a portion of the nitrogen effluent from said oxygen column to about 5 to 7 atmospheres absolute, means to liquefy the so compressed nitrogen effluent and conduct the so liquefied material to substantially the top of the said oxygen column as reflux for said column, means to refrigerate said oxygen column, and means to withdraw oxygen from said oxygen column as a product stream.

12. Apparatus according to claim 11, in which the said operating pressure of the oxygen column is substantially 1.3 atmospheres absolute.

13. Apparatus according to claim 11, in which the pressure produced by said second stage air compressor is substantially 2.4 atmospheres absolute.

14. Apparatus according to claim 11, in which the oxygen content of the said oxygen-enriched material is substantially 42 percent.

15. Apparatus according to claim 11, in which the pressure to which the said nitrogen effluents are compressed is substantially 5.6 atmospheres absolute.

16. Apparatus according to claim 11, together with means to compress a portion of the oxygen-enriched vapor from the output of the said vaporizer portion of the condenser-vaporizer to about 3 to 5 atmospheres absolute, means to liquefy said so compressed portion, and means to expand the so liquefied material to the said operating pressure of said oxygen column and conduct the same to an intermediate level of said oxygen column somewhate above the level at which any unliquefied feed is introduced into said column, thereby to increase the quantity of reflux liquid supplied to that column.

17. Apparatus according to claim 16, in which the said pressure to which said portion of oxygen-enriched vapor is compressed is substantially 4.0 atmospheres.

18. Apparatus according to claim 11, together with means to liquefy at least one product stream, and in which said means to refrigerate said oxygen column comprises means to further compress a portion of the said compressed nitrogen effluents to about 45 to 90 atmospheres absolute to provide refrigeration for effecting said liquefaction while supplying the needed refrigeration to support the process.

19. Apparatus according to claim 18, in which the said nitrogen effluents are compressed to substantially 75 atmospheres.

References Cited

UNITED STATES PATENTS

| | | | |
|---|---|---|---|
| 2,502,282 | 3/1950 | Schlitt | 62—30 XR |
| 2,514,391 | 7/1950 | Haynes | 62—26 |
| 2,582,068 | 1/1952 | Roberts | 62—39 XR |
| 2,765,637 | 10/1956 | Etienne. | |
| 2,955,434 | 10/1960 | Cost | 62—13 |
| 3,108,867 | 10/1963 | Dennis. | |
| 3,257,814 | 6/1966 | Carbonell | 62—39 XR |
| 3,348,384 | 10/1967 | Harmens | 62—26 XR |
| 3,186,182 | 6/1965 | Grossmann et al. | 62—26 |

NORMAN YUDKOFF, *Primary Examiner.*

W. V. PRETKA, *Assistant Examiner.*

UNITED STATES PATENT OFFICE
CERTIFICATE OF CORRECTION

Patent No. 3,392,536                                      July 16, 1968

Donald L. Smith

It is certified that error appears in the above identified patent and that said Letters Patent are hereby corrected as shown below:

In the heading to the drawings, Sheets 1 and 2, and in the heading to the printed specification, title of invention, "RECOMPRESSION OF MINGLED HIGH AIR SEPARATION USING DEPHLEGMATOR PRESSURE AND COMPRESSED LOW PRESSURE EFFLUENT STREAMS" should read -- RECOMPRESSION OF MINGLED HIGH PRESSURE AND COMPRESSED LOW PRESSURE EFFLUENT STREAMS --. Column 1, line 60, "iti s" should read -- it is --. Column 6, line 26, "dense-vaporizer" should read -- denser-vaporizer --. Column 7, line 3, "fed" should read -- feed --; line 43, "direct" should read -- indirect --.

Signed and sealed this 30th day of December 1969.

(SEAL)
Attest:

Edward M. Fletcher, Jr.                          WILLIAM E. SCHUYLER, JR.
Attesting Officer                                           Commissioner of Patents